Jan. 9, 1968 KAZUO YASUNAMI 3,362,226

SYSTEM FOR MEASURING FLUID PRESSURE

Filed June 30, 1965

INVENTOR.
KAZUO YASUNAMI
BY
ATTORNEY.

United States Patent Office 3,362,226
Patented Jan. 9, 1968

3,362,226
SYSTEM FOR MEASURING FLUID PRESSURE
Kazuo Yasunami, Ashiya-shi, Japan, assignor to
Kobe Steel Ltd., Kobe, Japan
Filed June 30, 1965, Ser. No. 468,494
Claims priority, application Japan, July 6, 1964,
39/37,311
2 Claims. (Cl. 73—398)

ABSTRACT OF THE DISCLOSURE

The present invention relates to an improved system for measuring fluid pressure, which comprises the steps of introducing a pressurized fluid to be measured into a metallic cylinder so as to develop strains in said cylinder by the pressure on said fluid, and converting the magnitudes of the thus developed strains into electric resistance values which represent said strain magnitudes whereby the pressure on said fluid may be electrically indicated.

Background of the invention

In a system of the prior art the magnitudes of both circumferential and axial strains are measured by the employment of a single-walled cylinder device, and accordingly, the ratio of the circumferential strain to the axial strain is confined to a given small value (about 1:3, in a case of steel cylinders), the ratio will inevitably have the characteristics as shown with broken lines in FIG. 5, and error in measuring fluid pressure is substantially great.

The objects, features and attendant advantages of the present invention will become apparent to those skilled in the art from a reading of the following explanation thereof in conjunction with the accompanying drawings.

Description of the preferred embodiment

Figure 1:
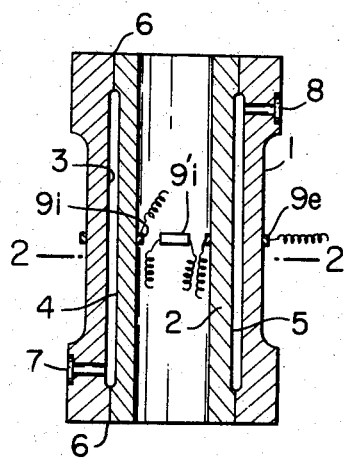
FIG. 1 is a vertically sectional view of a metallic cylinder device suitably employed for carrying out the present invention.

For the purpose of carrying out the present invention, a double-walled metallic cylinder device as shown in FIG. 1 can be suitably employed. As shown in FIG. 1, the cylinder device generally comprises an outer cylindrical member 1 having a suitable outer diameter and a suitable wall thickness, and a coaxial inner cylindrical member 2 having an outer diameter slightly smaller than the inner diameter of the outer member so that the inner member snugly fits in the outer member and has a wall thinner than that of the outer member. The inner periphery of the outer cylindrical member 1 is provided with a very shallow annular recess 3 extending over a substantial portion of the length of the outer member between the opposite ends thereof. The outer periphery of the inner cylindrical member 2 also is provided with an annular recess 4 over a substantial portion of the length of the inner cylindrical member between the opposite ends thereof. Recesses 3 and 4 have the same length and are so positioned in their respective cylindrical members that in assembly these recesses come face to face so as to define an annular pressure receiving chamber 5 between the opposite peripheral surfaces of the two cylindrical members with its opposite ends sealed. For the purpose of sealing the opposite ends of the pressure receiving chamber 5, the junctions between the opposite peripheral surfaces at both ends of the outer and inner cylindrical members 1 and 2 may be welded at 6 and 6 as shown in FIG. 1 or sealing rings are inserted between the opposite peripheral surfaces at both ends of the two members. The outer cylindrical member 1 is further provided near its one end (the lower end as seen in FIG. 1) with a fluid inlet 7 which communicates with a suitable fluid supply source at one end and communicates through a transverse communication passage with pressure receiving chamber 5 at the other end. Thus, a pressurized fluid alone may be introduced into the pressure receiving chamber 5 or alternatively the fluid may be introduced there together with any suitable carrier medium and the pressure on the fluid can be maintained in the pressure receiving chamber 5. Prior to the introduction of the pressurized fluid, the air within the pressure receiving chamber 5 is evacuated to the atmosphere through an air escape valve 8 which is provided near the other end (the upper end as seen in FIG. 1) of the outer member 1. The air escapes from the pressure receiving chamber to the atmosphere.

The pressurized fluid which has been introduced into pressure receiving chamber 5 presses outwardly against recess 3 of the outer member so as to cause the outer member 1 to expand and at the same time presses inwardly against recess 4 of inner member 2 so as to compress inner member 2. Therefore, outer member 1 is subjected to a circumferentially expansive strain whilst inner member 2 is subjected to a circumferentially compressive strain. The magnitudes of strains in the two cylindrical members caused by the two different types of stress vary in response to variations in the pressure on the fluid introduced into pressure receiving chamber 5.

According to the present invention, the pressure on such fluid can be determined by converting the magnitudes of strains in the two cylindrical members caused by the above-mentioned two types of stress into electric resistance values. A strain meter is employed to detect variations in the magnitudes of strains in the cylindrical members and a bridge circuit is employed to convert the thus detected strain magnitudes into electric resistance value. Strain meters suitable for use in the practice of the present invention include the so-called resistance wire-type strain meters and the so-called semiconductor-type strain meters. However, so far as the gauge ratio or the ratio of variations in electric resistance values caused by variations in strains to the magnitudes of strains $$\frac{\Delta R/R}{\epsilon}$$

is concerned, since the semiconductor-type strain meter can detect over a range several tens to one hundred times as wide as the resistance wire-type strain meter, the semiconductor-type strain meter has the advantage over the resistance wire-type strain meter since it does not require the use of an amplifier.

In order to energize the strain meter in response to the strains developed in the outer and inner cylindrical members 1 and 2, the strain sensing elements of the strain meter are disposed in a circumferentially spaced relation in the outer periphery of outer member 1 and in the inner periphery of inner member 2 respectively. According to the present invention, two pairs of strain sensing elements 9e, 9e and 9'e, 9'e are disposed in a circumferentially spaced relationship in the outer periphery of outer member 1, the two elements constituting each pair being disposed in diametrically opposed relationship. Similarly, two pairs of strain sensing elements $9i$, $9i$ and $9'i$, $9'i$ are disposed in a circumferentially spaced relation in the inner periphery of inner member 2, the two elements constituting each pair being disposed in diametrically opposed relationship (see FIG. 2). The two pairs of elements $9e$, $9e$ and $9'e$, $9'e$ are adapted to sense a circumferentially expansive strain which may develop in the outer peripheral surface of outer member 1 whilst the other two pairs of elements $9i$, $9i$ and $9'i$, $9'i$ are adapted to sense a circumferentially compressive strain which may develop in the inner peripheral surface of inner member 2.

Figure 2:
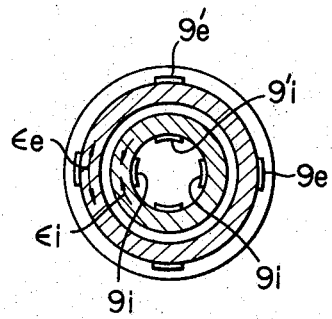
FIG. 2 is a cross-sectional view taken substantially along the line 2—2 of FIG. 1.

Two diametrically opposed strain sensing elements constitute one pair and two or more pairs of such elements are provided in a strain meter. These strain sensing elements are disposed in an equally spaced relationship in the outer periphery of outer member 1 and in the inner periphery of inner member 2 respectively as shown in FIG. 2. In the embodiment illustrated in FIGS. 1 and 2, two pairs of strain sensing elements $9e$, $9e$ and $9'e$, $9'e$ are disposed in outer member 1 and the other two pairs of strain sensing elements $9i$, $9i$ and $9'i$, $9'i$ are disposed in inner member 2.

Figure 3:
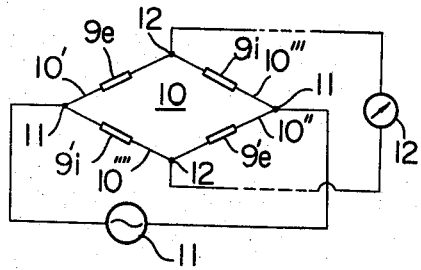
FIGS. 3 and 4 are respectively schematic views of different types of bridge circuits employed in said cylinder device.

Since the sign representing the magnitudes of the strain detected by the strain sensing elements $9e$, $9e$ and $9'e$, $9'e$ disposed in the outer member 1 and the sign representing the magnitudes of the strain detected by the strain sensing elements $9i$, $9i$ and $9'i$, $9'i$ disposed in the inner member 2 are in the exact reverse, the algebraic difference between the magnitudes of these two types of strains detected by the two groups of strain sensing elements can be represented by the sum of both the absolute values of the thus detected strain magnitudes. Therefore, the value of this algebraic difference is taken out as an electric resistance value and the same is expressed as a change in an ampere or a voltage value whereby the pressure on the fluid can be indirectly determined. For that purpose a bridge circuit is employed. One suitable type of bridge circuit which can be employed in the practice of the present invention is schematically illustrated in FIG. 3. As seen in this figure, a pair of strain sensing elements are inserted in each of the four arms of this bridge circuit 10, that is, the elements $9e$ and $9e$ are inserted in the first arm $10'$, the elements $9'e$ and $9'e$ are inserted in the second arm $10''$, the elements $9'i$ and $9'i$ are inserted in the third arm $10'''$ and the elements $9'i$ and $9'i$ are inserted in the fourth arm $10''''$. Furthermore, in this circuit, a suitable power source 11 is connected between a first pair of opposite terminals 11 and 11 and an electric indicator or recording meter 12 is directly connected between a second pair of opposite terminals 12 and 12. If desired the electric indicator or recording meter may be connected through a suitable amplifier to the second pair of terminals. When a semiconductor-type strain meter is employed in the bridge circuit 10, instead of the electric indicator or recording meter, an ampere meter or a volt meter can be directly connected between the second pair of opposite terminals 12 and 12. As for the power source 11, the source may be either an A.C. or a D.C. power source as the case may be.

Figure 4:
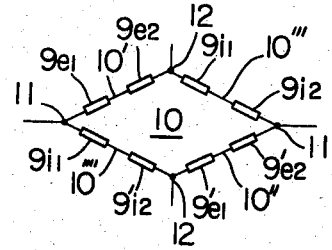

In the illustrated bridge circuit 10, at the output side thereof (the side at which the electric instrument is positioned) the algebraic difference between the electric resistance value corresponding to the magnitude of the expansive strain detected by the sensing elements $9e$, $9e$ and $9'e$, $9'e$ and the electric resistance value corresponding to the magnitude of the compressive strain detected by the sensing elements $9i$, $9i$ and $9'i$, $9'i$ or the sum of the absolute values of both the two types of electric resistance values is indicated. An example in which a plurality of pairs of strain sensing elements are inserted in each of the four arms of the bridge circuit 10 is shown in FIG. 4. In this modified bridge circuit, two pairs of sensing elements $9e1$, $9e1$ and $9e2$, $9e2$ are inserted in the first arm $10'$, two pairs of sensing elements $9'e1$, $9'e1$ and $9'e2$, $9'e2$ are inserted in the second arm $10''$, two pairs of sensing elements $9i1$, $9i1$ and $9i2$, $9i2$ are inserted in the third arm $10'''$, and two pairs of sensing elements $9'i1$, $9'i1$ and $9'i2$, $9'i2$ are inserted in the fourth arm $10''''$. By the employment of this modified circuit, error in measuring occuring in the prior art systems due to variations in the prevailing temperature is eliminated. Accordingly, when the strain sensing elements to be inserted in the same one arm have the same thermal properties, the measuring can be performed with a very high accuracy.

It has been recognized that the relation between the pressure on the fluid which has been introduced in the pressure receiving chamber 5 between the outer and inner cylindrical members 1 and 2 and circumferential strains to be developed in both the cylindrical members as these members are subjected to such fluid pressure is linear until the fluid pressure within the chamber 5 will reach a predetermined level. For convenience sake, it is assumed that the outer and inner cylindrical members 1 and 2 are formed of the same material; then the modulus of longitudinal elasticity of the members is E, the pressure on a fluid to be introduced into the pressure receiving chamber 5 is P, the thickness of the outer member 1 is K$e$ and the thickness of the inner member 2 is K$i$. Then the magnitude of a circumferentially expansive strain which develops in the outer peripheral surface of the outer member 1 can be expressed by the following equation:

$$\epsilon_e = \frac{2}{E(K_e^2-1)}P \qquad (1)$$

And the magnitude of a circumferentially compressive strain which may develop in the inner peripheral surface of inner member 2 can be expressed by the following equation:

$$\epsilon_c = \frac{2K_i^2}{E(K_i^2-1)}P \qquad (2)$$

Since the strain magnitude corresponding to an output which may develop at the output side of the above mentioned bridge circuit 10 is the algebraic difference between Equations 1 and 2, this strain magnitude can be expressed by the following equation:

$$\epsilon_e - \epsilon_i = \left(\frac{2}{K_e^2-1} + \frac{2K_i^2}{K_i^2-1}\right)\frac{P}{E} \qquad (3)$$

Figure 5:
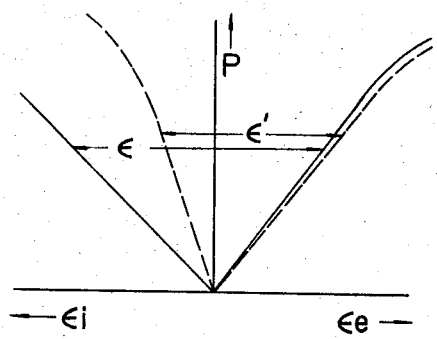
FIG. 5 is a graph illustrating relations between strain magnitudes and fluid pressures.

As is clear from Equation 3, the sum of the absolute values of the magnitudes of the two types of strains (expansive and compressive strains) maintains a linear relation with respect to the pressure P on a fluid to be measured and this linear relations is as illustrated the graph of FIG. 5. Thus, if the constants for the right terms in Equation 3 are suitably selected in designing the outer and inner cylindrical members, by reading a figure marked on the graduation plate of the electric instrument 12 on which the pointer of the ampere meter 12 is positioned and by converting the reading into a value in terms of fluid pressure the pressure P on the fluid can be determined. If the values for K$e$, K$i$ and E are so selected that the constants for them will become 1, the following equation is established:

$$\epsilon_e - \epsilon_i = P$$

and the difference between the magnitudes of the two types of strains itself indicates the pressure P on the fluid.

In short, the present invention is characterized by the fact that a pressurized fluid is introduced between the outer and inner cylindrical members which constitute a double-walled cylinder device so as to develop a circumferentially expansive strain in the outer cylindrical member and a circumferentially compressive strain in the inner cylindrical member and the algebraic difference between the magnitudes of the two types of strains is utilized to determine the pressure on the fluid. The novel system is advantageous over any of the similar prior art systems.

Since the cylinder device comprises a cylindrical member adapted to develop a circumferentially expansive strain and another smaller coaxial cylindrical member is adapted to develop a circumferentially compressive strain and the relation between the two types of strains developing in both the cylindrical members may be optionally selected, the magnitudes of strains in both the cylindrical members can be allowed to substantially increase and accordingly, the accuracy in measuring the fluid pressure can be greatly enhanced. Therefore, in the system of the prior art the algebraic difference between the magnitudes of both the circumferential and axial strains $\epsilon'$ is much smaller as compared with the algebraic difference obtainable by the system of the present invention in which the characteristics of two types of strains can be separately established.

According to the prior art system, the linear relation cannot be maintained when the pressure on the fluid exceeds a certain predetermined value and measurement of a fluid pressure whose value is near the upper limit of the linear zone is inevitably unreliable. However, according to the present invention, since the algebraic sum of the magnitudes of the two types of strains can be made greater, error in measurement in such an unstable zone (the zone beyond the upper limit of the liner) can be limited to a negligible degree, and accordingly, the upper limit of the linear relation can be raised.

Furthermore, as mentioned above, since the strain sensing elements for detecting the expansive strain and the strain sensing elements for detecting the compressive strain are disposed on different cylindrical members respectively, the properties of the two types of strains can be made most suitable for the characteristics of the different types of strain sensing elements. Accordingly, the strain meter employed can be utilized without being subjected to undue strains. In regard to this point, in the system of Japanese Patent No. 294,153, one strain sensing element is at all times subjected to the restriction imposed by the other element and the properties of both the different types of elements can not be fully utilized.

From the foregoing description of the invention, it is clear that the present invention has provided an improved system which can measure the pressures on various fluids with very high accuracy by the employment of a simple device when the system is employed for measuring fluids under either static or dynamic pressure, and the same will greatly contribute to the art.

While one specific embodiment of the present invention has been shown and described in detail it will be understood that the same is for the purpose of illustration only and is not to be taken as a definition of the scope of the invention, reference being had for this purpose to the appended claims.

What is claimed is:

1. An apparatus for determining the pressure of a pressurized fluid comprising:

an outer and an inner cylindrical shell of identical lengths, with opposite open ends, and having walls of predetermined thicknesses;

said outer shell having an inner diameter exceeding that of the outer diameter of the said inner shell;

said shells coaxially arranged with the end portions of the outer surface of said inner shell tightly sealed to the corresponding end portions of the inner surface of the outer shell;

the space between the inner surfaces of the outer shell and the outer surfaces of the inner shell together forming a double walled cylindrical pressure chamber;

a pressurized fluid source connected through an orifice with said pressure chamber;

means for air escape connected through an orifice in said pressure chamber;

and strain meter means mounted to sense the circumferentially compressive strain of the wall of said inner member as developed by the pressure from said pressurized fluid source, to convert the algebraic difference between the magnitudes of the strains of said walls of said inner and outer cylinders into measurable electric resistance values;

and to indicate said resistance values to determine the pressure.

2. A device for determining the pressure of a pressurized fluid as claimed in claim 1, said strain meter including a bridge circuit, the thickness of said outer cylindrical shell $K_e$ being greater than the thickness $K_i$ of said inner cylindrical shell, P representing the fluid pressure and E the modulus of longitudinal elasticity thus developing a magnitude of circumferentially expansive strain expressed by equation (1)
$$\epsilon_e = \frac{2}{E(K_e^2-1)} P$$

a magnitude of circumferentially compressive strain expressed by equation (2)
$$\epsilon_i = \frac{2K_i^2}{E(K_i^2-1)} P$$

said strain meter including a bridge circuit means to determine the algebraic difference between said Equations 1 and 2 to express the air strain magnitude by equation (3)
$$\epsilon_e - \epsilon_i = \left(\frac{2}{K_e^2-1} - \frac{2K_i^2}{K_i^2-1}\right)\frac{P}{E}$$

said bridge circuit including a power source connected between a first pair of opposite terminals and an electric indicator connected between a second pair of opposing terminals, a graduation plate with an ampere meter, a pointer, and means to convert the reading into a fluid pressure value P, whereby when the values $K_e$, $K_i$ and E are selected such that the factor of P in Equation 3 equals 1, the difference between the magnitudes of the said expansive and compressive strains itself indicates the pressure P under the following equation:

$$\epsilon_e - \epsilon_i = P$$

References Cited

UNITED STATES PATENTS

| 2,398,372 | 4/1946 | Green | 73—398 X |
| 2,942,219 | 6/1960 | McGrath | 73—398 X |
| 3,234,795 | 2/1966 | Li | 73—406 X |
| 3,273,400 | 9/1966 | Pastan | 73—398 |

LOUIS R. PRINCE, *Primary Examiner.*

DONALD O. WOODIEL, *Assistant Examiner.*